July 9, 1968   G. F. RILEY   3,391,943
ANTI-SMOG PISTON AND RING ASSEMBLY
Filed Oct. 23, 1965   2 Sheets-Sheet 2

INVENTOR
George F. Riley

BY *Stevens, Davis, Miller & Mosher*
ATTORNEYS

United States Patent Office 3,391,943
Patented July 9, 1968

3,391,943
ANTI-SMOG PISTON AND RING ASSEMBLY
George F. Riley, 1617 N. Cahuegna St.,
Hollywood, Calif. 90028
Filed Oct. 23, 1965, Ser. No. 504,005
5 Claims. (Cl. 277—137)

ABSTRACT OF THE DISCLOSURE

A piston ring assembly comprising a plurality of ring members seated over an expander in a groove of a reciprocating piston, each ring member being made up of an arcuate ring segment and an arcuate wedge portion, the combined lengths of the wedge portions extending around the full circumference of the groove.

---

This invention relates to a piston ring to be used in reciprocating equipment and more particularly to a sealing device carried by a reciprocating piston which provides a uniform expansion seal against the wall of its associated cylinder.

In the use of reciprocating equipment, one major problem exists which has yet to be solved, this being the escaping of fuel gasoline from the combustion chamber to the crankcase and, conversely, the escape of oil from the crankcase to the combustion chamber. Both of these are caused by an inadequate seal between the piston and cylinder, which leads to numerous problems, including decreased compression, increased gasoline and oil consumption, sticking valves, dirty spark plugs, etc.

There have been many attempts to provide a sealing device that will eliminate the above, such as, for example, the provision of piston rings having different splits or cuts, joints, locks, etc. Also, it has been proposed to provide piston rings with tapered faces and twisted seals with two or more bodies, and with various different shapes. Further proposals provide a two-piece ring with a seal joint, and a ring with as many as three or four pieces. However, none of the above-mentioned proposals have been successful in providing an adequate seal between the piston and the cylinder wall.

In general, this invention provides a novel and unique sealing device which solves the above-mentioned problems by providing a uniform radial expansion seal acting outwardly on the cylinder which will not be affected by wear, and which is strong enough to minimize the escape of gasoline and oil.

Briefly summarized, the present invention involves the use of an expander and a plurality of ring members, all of which are inserted in an abutting relationship in a groove in the piston that is to be sealed. Each ring member consists of a ring segment and a wedge portion, the respective ends of each being in contact and inclined at a certain angle. The wedge portions of each ring member are of an equal arcuate length and are staggered around the circumference of the groove so that their combined arcuate lengths extend around the full circumference of the groove. Due to the outward force exerted by the expander on the ring members and the presence of the wedge members, an expansion seal is obtained which is not affected by wear, and which is of a uniform high strength throughout the entire circumference of the groove.

Further objects and advantages of the present invention will be apparent from the following description, reference being had to the accompanying drawings wherein preferred embodiments of the present invention are clearly shown:

Figure 1:
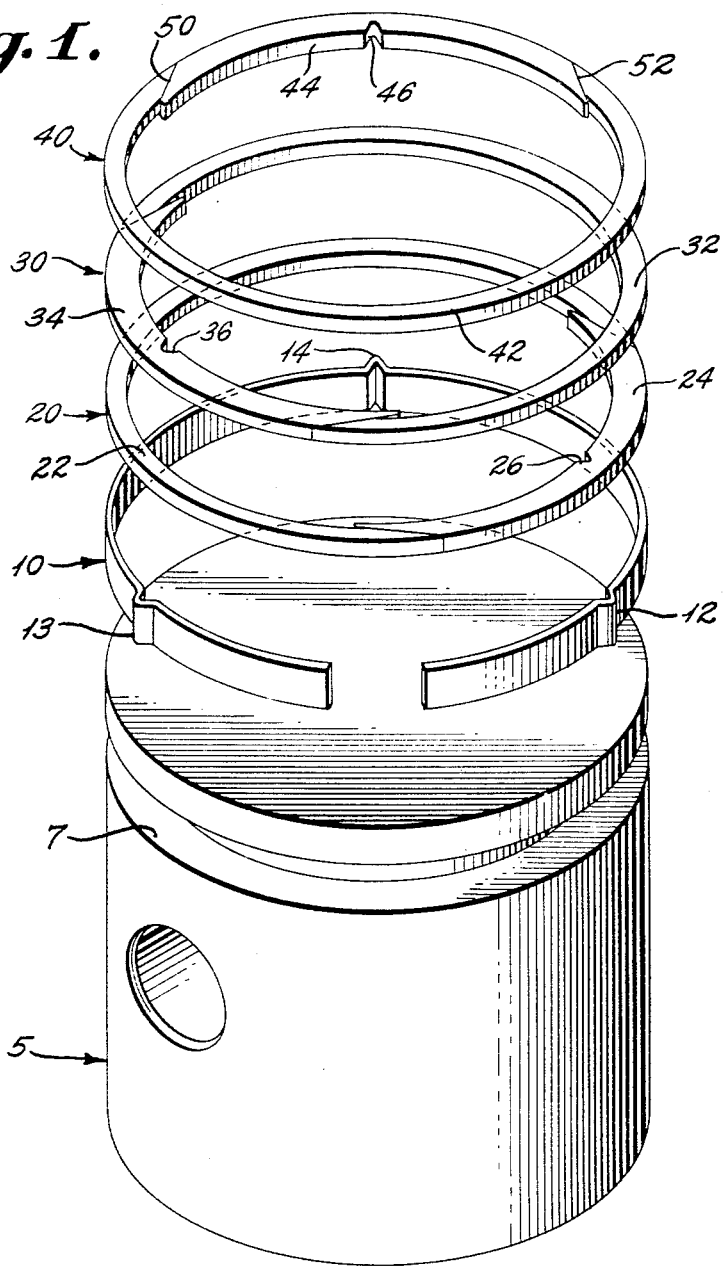
FIGURE 1 is an exploded perspective view of the sealing device of the present invention shown in connection with a grooved piston.
Figure 3:
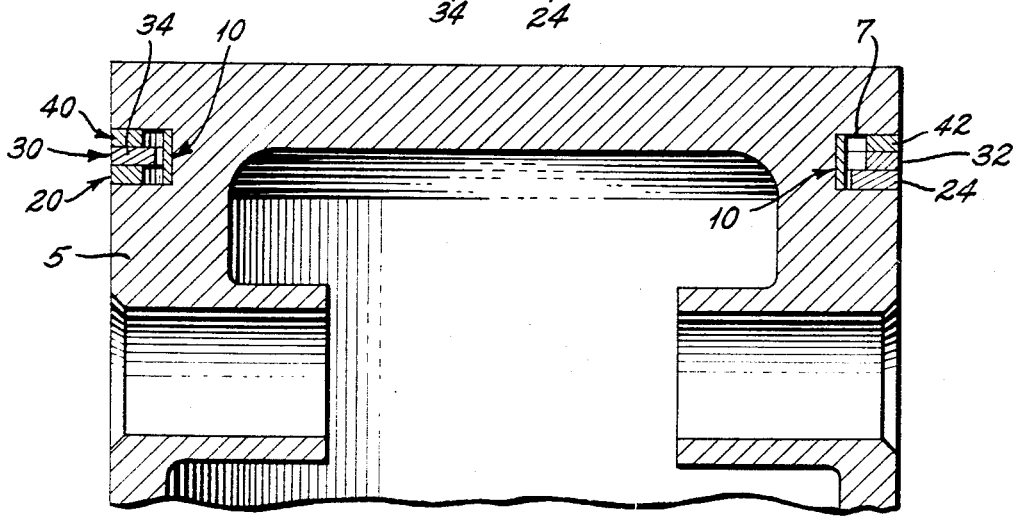
FIGURE 3 is a fragmentary vertical sectional view taken along line 3—3 of FIGURE 2.

Referring now in greater detail to FIGURE 1, the numeral 5 represents a piston which may be utilized in any reciprocal equipment having an annular groove 7 provided therein. A split annular expander 10, shown in its exploded position in FIGURE 1 is normally inserted adjacent the rear wall of said groove as seen in FIGURE 3, and has three ribs 12, 13 and 14 formed on the outer peripheral surface thereof. Expander 10 is constructed in a known manner so as to provide a uniform tension in a direction outward from the groove. Also provided are ring members 20, 30 and 40 shown in their exploded position in FIGURE 1, but normally seated in the groove 7 in an abutting relationship as generally shown in the left hand portion of FIGURE 3. When in the latter position, each ring member has an inner wall adjacent the outer wall of said expander. Ring member 20 comprises a ring segment 22 and a wedge portion 24. Likewise, ring members 30 and 40 each respectively comprise ring segments 32 and 42 and wedge portions 34 and 44.

Figure 2:
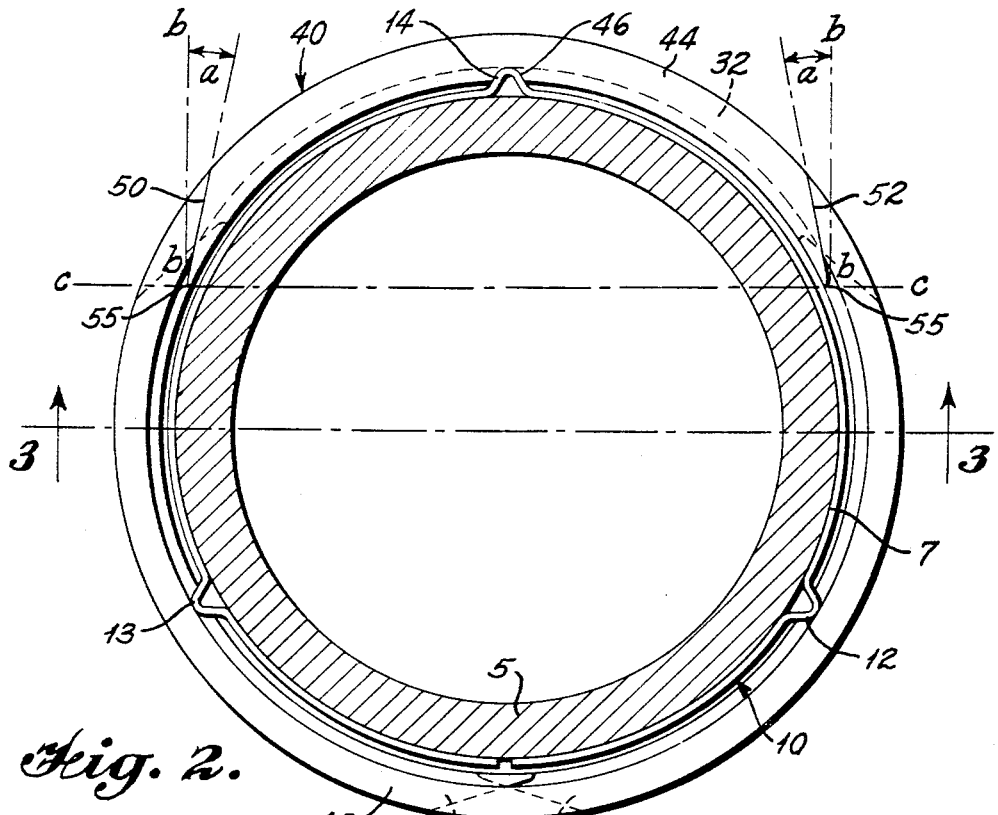
FIGURE 2 is a transverse horizontal sectional view of a piston, showing the sealing device inserted in an annular groove of said piston.

The respective ends of the ring segment and wedge portion of each ring member are inclined and in contact with one another so as to produce an outward wedging action due to the action of said expander. For example, as seen in FIGURE 2, upper ring 40 is shown in solid lines and comprises upper ring segment 42 and upper wedge portion 44, the respective ends of which contact along lines 50 and 52. The respective wedge portions and ring segments of ring members 30 and 40 contact in a similar manner as shown by the dotted lines in FIGURE 2.

Each ring member 20, 30 and 40 is respectively provided with a notch 26, 36, and 46, each of which in turn respectively engage corresponding rib 12, 13 and 14 of expander 10 when the ring members are placed in their normal position in groove 7. For example, the ring member 30, better shown in FIGURE 1, has a notch 36 which is adapted to engage rib 13 of expander 10. The engagement of each notched portion of the ring members with the respective rib portion of the expander 10 is for the purpose of preventing any relative sliding motion of the ring members with respect to the groove.

The wedge portions 24, 34 and 44 may be of a greater width than that of their corresponding ring segments and are preferably constructed of a material which wears more rapidly than that of the ring segments.

In order to permit the above-mentioned wedging action, the respective ends of each of said ring segments and wedge portions are inclined at an angle $a$, which is shown in FIGURE 2, ring member 40 being described by way of example. This angle is an acute angle with respect to line $b$—$b$, passing through the innermost point 55 of contact of the ends of the respective ring segments and wedge portions and perpendicular to a line $c$—$c$ connecting said ends. It is to be understood that this inclination also applies to ring members 20 and 30. An acute angle of approximately 15° may be used for the above-mentioned purposes.

As better seen in FIGURES 1 and 2, the wedge portions are of an arcuate length so that when disposed in the groove in a staggered relationship, they will extend over the full circumference of the groove. Thus, in the above-mentioned example, since there are three wedge portions, each would have an arcuate length of 120° so that when placed in said groove in a staggered relationship, they extend around the full circumference of the groove as better viewed in FIGURE 1.

It is to be emphasized that the above-mentioned embodiment is taken by example only, and that variations of the number of ring members is possible without departing from the scope of the invention. For example, there may be four ring members, in which case each wedge portion would extend for 90°. In this case, four rib portions would be formed in expander 10, one for each of said ring members.

The operation of the device is as follows: the ring members are inserted in an abutting relationship against expander 10 in groove 7 as described above. The wedging action provided by each wedge member 24, 34 and 44 provides a uniform expansion outwardly, thus effecting a seal of increased uniform strength, which minimizes the above-mentioned flow of gasoline from the combusion chamber into the crankcase and the flow of oil into the combustion chamber. Also, this seal is not affected by wear of the respective ring members.

This, of course, results in many advantages, such as increased compression, more efficient combustion, the prevention of the dilution of oil by the uncombusted gasoline, savings in oil and gasoline consumption, prevention of the passing of oil to the combustion chamber causing thick exhaust and "smog," and the clearing of the combustion chamber of carbon deposits.

There has been illustrated and described what is considered to be the preferred embodiments of the invention. It will be understood, however, that various modifications may be made without departing from the broader scope of the invention as described by the following claims.

What is claimed is:

1. A device to be inserted in an annular groove of a reciprocating piston to seal same from a corresponding cylinder wall, said device comprising an annular expander seated adjacent the wall of the groove and adapted to expand in an outward direction therefrom; at least two ring members seated in said groove with the inner wall of each ring member adjacent the outer wall of said expander; each ring member comprising an arcuate ring segment and an arcuate wedge portion, the respective ends of which are inclined and in contact, said wedge portions having a larger radial dimension than said ring segments and being staggered around said groove so that their combined lengths extend around the full circumference of said groove; and at least two projecting portions formed on said expander and projecting radially outwardly therefrom, said expander contacting said wedge portions only by engagement of each of said projecting portions substantially at the center of the inner wall of a corresponding wedge portion.

2. The device of claim 1, wherein a notch is formed substantially at the center of the inner wall of each wedge portion, each of said projecting portions engaging a corresponding notch to prevent relative slidable movement between said expander and each ring member.

3. The device of claim 1, wherein said wedge portions are of a material that wears more rapidly than the material of said ring segments.

4. The device of claim 1, wherein the respective ends of each of said ring segments and wedge portions are inclined at an acute angle with respect to a line passing through the innermost part of contact of said ends and perpendicular to a line connecting said ends.

5. The device of claim 1, wherein there are three ring members seated in said groove, each of said wedge portions extending for 120° around said groove.

References Cited

UNITED STATES PATENTS

| 1,280,493 | 10/1918 | Kurtz. | |
| 1,282,347 | 10/1918 | Wilson | 277—218 |
| 1,735,466 | 11/1929 | Le May | 277—190 |
| 3,186,725 | 6/1965 | Wankel et al. | 277—218 |
| 3,295,857 | 1/1967 | Lutz | 277—199 X |

FOREIGN PATENTS

| 1,093,798 | 5/1955 | France. |
| 471,119 | 2/1929 | Germany. |

LAVERNE D. GEIGER, *Primary Examiner.*

J. S. MEDNICK, *Assistant Examiner.*